Feb. 6, 1951 E. V. HICKEY 2,540,881
BRICKMAKING
Filed July 1, 1946 2 Sheets-Sheet 1
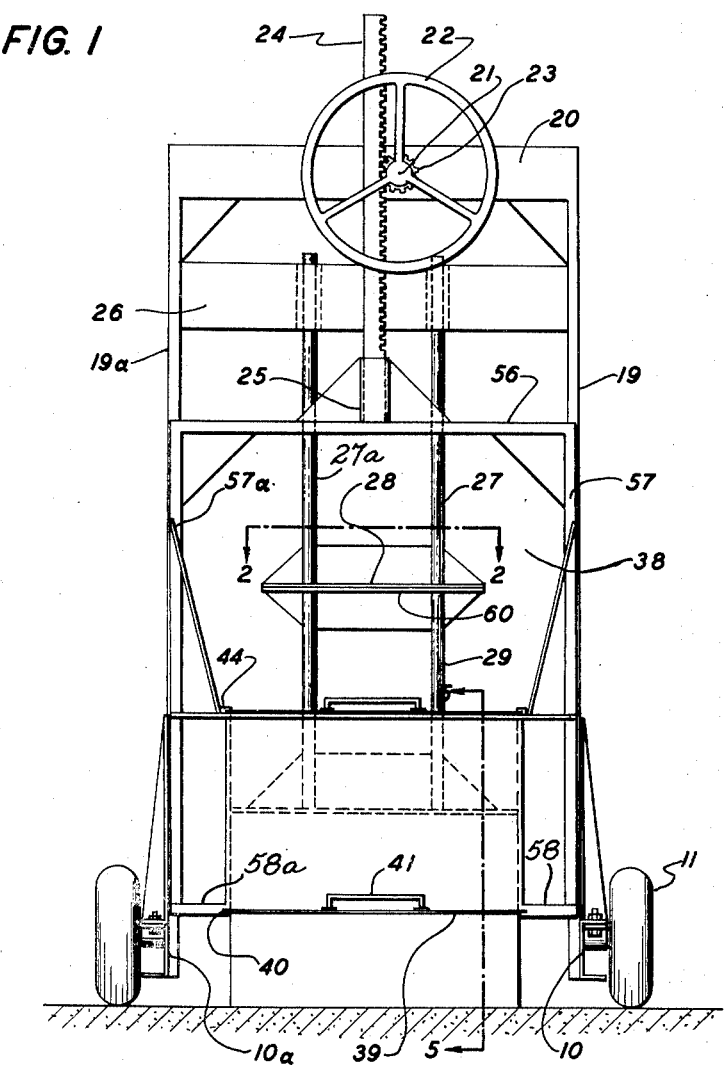
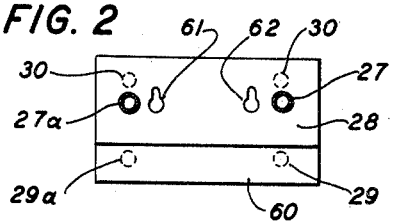
INVENTOR.
EMORY V. HICKEY
BY
ATTORNEYS Feb. 6, 1951 E. V. HICKEY 2,540,881
BRICKMAKING Filed July 1, 1946 2 Sheets-Sheet 2

INVENTOR.
EMORY V. HICKEY
BY
Chester and Angus
ATTORNEYS

Patented Feb. 6, 1951

2,540,881

UNITED STATES PATENT OFFICE 2,540,881

BRICKMAKING

Emory V. Hickey, Pasadena, Calif., assignor of one-half to Hayward W. Olson, Monrovia, Calif.

Application July 1, 1946, Serial No. 680,533

9 Claims. (Cl. 25—156)

This invention relates to adobe bricks and means and methods of making them, and has for its principal object to decrease the time required to make and cure an adobe type of brick. A related object is to increase the strength of the bricks.

The common adobe brick is ordinarily made in the form of a rectangular prism, the standard dimensions being 4" x 12" x 18". Such a brick is ordinarily made by making a mud of ordinary clay mixed with water. An asphalt emulsion is often mixed also, to act as a waterproofing to prevent washing away of the brick in use. The mud is usually poured or shovelled into a suitable form dimensioned according to the dimensions of the brick, after which the form is removed, and the brick is left to rest on a platform or support for a time to allow it to set and harden. The hardening time depends upon weather conditions and also on the amount of water mixed with the clay in the brick, as evaporation of this water is required before the brick is hardened.

Owing to the flowing consistency of the mud, it has heretofore been necessary to lay the bricks down flat on their surface of largest area, that is, one of the 12" x 18" surfaces in the case of a standard brick, in order to prevent the brick from drooping and falling down of its own weight while still wet. To compensate for the evaporation of water, it has furthermore been the practice to add sand or straw into the brick as a filling to take up the space left by the loss of the water, and thereby prevent cracking of the bricks.

It is desired to use as little water as possible in making the mud, because the greater the proportion of water, the longer it takes for the brick to dry, and the more sand or straw is required as compensation for its loss.

I have found that by setting the bricks on one of their smaller area sides, for example the 4" x 18" dimension, in the case of a standard brick, I am able to form the brick by use of less water than when the brick is dried according to the common practice of resting it on its large surface. The reason for this appears to be that when a brick is rested on one of its shorter dimensioned sides, the mud can be made to fill the form at a much less liquid consistency than when the brick is placed on its largest surface. Since the mud has less water in it when it is formed, the brick is immediately self-supporting even when rested on its shorter dimension, and since it has less water in it at the start, it will dry out much more rapidly.

I have found, for example, that I am able to move bricks formed according to my method within 24 hours after molding them, as compared with the longer period of about five days which are usually required for the setting of bricks before they are moved. Furthermore, I am able to use my bricks in about ten to eighteen days as compared with the usual 30 to 35 days which it has heretofore taken for sufficient drying out.

Moreover, by reason of the use of less water initially, I am enabled to avoid the use of sand or straw or the like to compensate for the loss of water; and in consequence my bricks are not weakened due to the introduction of these extraneous materials.

My invention will be better understood from the following detailed description and the accompanying drawings of which Fig. 1 is a front elevation view of a molding machine for molding bricks according to my invention;

Fig. 2 shows a detailed view taken at line 2—2 of Fig. 1;

Figure 4:
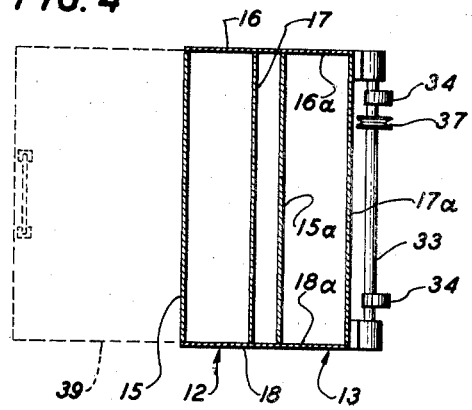
Fig. 4 shows a cross section view taken at line 4—4 of Fig. 3.
Figure 3:
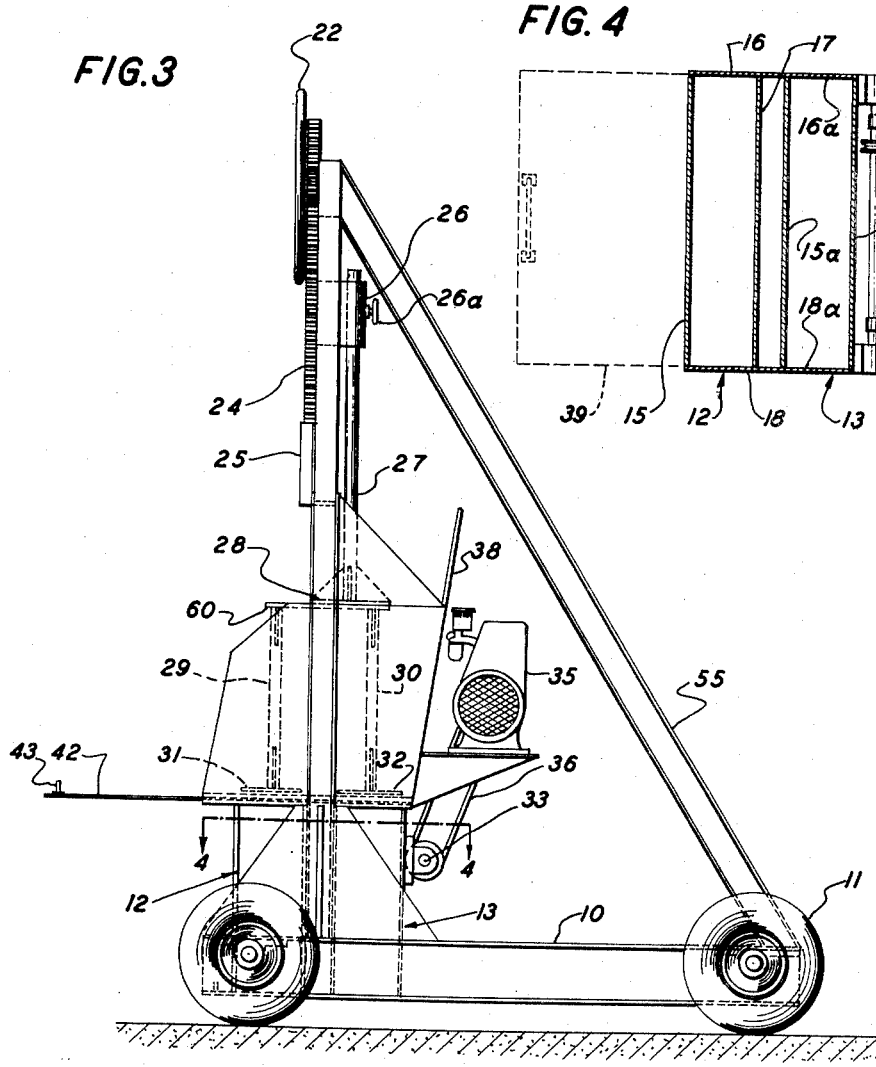
Fig. 3 shows a side elevation view of the machine.

The machine shown in the drawings is adapted to form and lay the adobe bricks. The machine comprises a pair of horizontal side beams 10 and 10a, carrying four wheels 11 which may, if desired, be arranged to run on a track.

There is provided between the beams at the front end a pair of forms 12 and 13 in which the bricks are formed. Each of the forms 12 and 13 comprises four vertical walls, these being 15, 16, 17 and 18, for form 12; and 15a, 16a, 17a and 18a for form 13. The dimensions of these vertical walls are the same as the respective dimensions of the sides of the bricks to be formed. Thus for a standard brick, the walls 15, 17, 15a and 17a will be 12" x 18" and the walls 16, 18, 16a and 18a will be 4" x 12", the vertical height of each wall being the 12" dimension. The top and bottom of the rectangular prisms formed by these vertical walls are left open so that mud can be shovelled in at the top, and the molded brick released through the bottom.

The machine is provided with a frame comprising a pair of spaced uprights or girders 19 and 19a, a crosspiece 20 placed across the tops of the uprights, and a pair of braces 55. There is journaled through the crosspiece a shaft 21 having mounted thereon a handwheel 22 and a pinion 23 arranged to engage the teeth of a vertical rack 24 which slides through a guide 25 fixed to the frame of the machine. The lower end of the rack is fastened to the bar 56 of a movable frame having a pair of side members 57 and 57a which slide along the fixed uprights 19 and 19a. The lower ends of members 57 and 57a carry supports 58 and 58a which hold the forms 12 and 13. When the handwheel is turned, the movable frame carrying the forms is raised or lowered.

There is attached to the fixed uprights 19 and 19a cross bar 26 having a vertical hole through which a pair of vertical rods 27 and 27a slide and the bar is adapted to be clamped by a set screw 26a. The lower end of rods 27 and 27a are attached to a platform 28 to which is attached a plate 60 carrying four depending rods 29, 29a, 30 and 30a. These rods carry a pair of ejecting plates 31 and 32 respectively which are rectangular in shape and dimensioned to fit nicely within the rectangular prisms 12 and 13. The arrangement is such that when the plates 31 and 32 are set on top of the mud in the forms, and the handwheel is then turned to lift the forms, the wet bricks in the forms are ejected out the bottom.

For convenience, upper plate 28 is provided with a pair of keyed holes 61 and 62 adapted to receive corresponding lugs from lower plate 60 to hold the lower plate flat against the upper plate, thus providing means for easy attachment and detachment of the upper and lower plates.

There is mounted on the frame of the vehicle a vibrator, this being in the form of a shaft 33 having eccentrics 34 thereon. The shaft is driven from an engine 35 by means of a belt 36 engaging a pulley 37. The turning of the shaft 33 vibrates the molds 12 and 13 to shake the wet brick out of them.

To enable the molds 12 and 13 readily to be filled with mud, there is provided a suitable trough or hopper 38 against which the mud can be shoveled and allowed to drop down into the forms. To facilitate the complete filling of the forms with mud in order to make a substantially perfect brick, the vibrator is preferably turned on when the mud is poured, as this will cause the mud to shake and flow to all corners and parts of the form. To hold the mud against immediately dropping through the forms, there is provided a shelf 39 adapted to slide through slots 40 on either side of the frame thereof; and a handle 41 is provided to enable the shelf readily to be slid in and out. The arrangement is such that the shelf 39 slides in under both of the molds 12 and 13, to act as a base or floor for the mud which is thrown into the hopper. When the forms 12 and 13 are filled with the mud, an upper scraper 42, provided with a handle 43 similar to handle 41, is arranged to slide across the top of the forms through slots 44, thereby scraping the mud off flush and even to form one edge of the brick.

Figure 5:
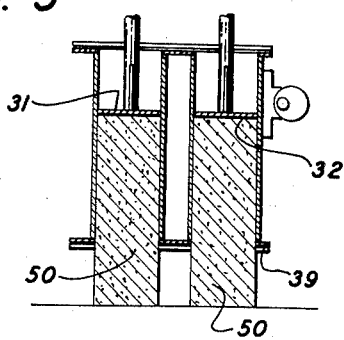
Fig. 5 shows a cross section view taken at line 5—5 of Fig. 1.

In operation, the bottom plate 41 is fully inserted underneath the forms 12 and 13, and the mud is poured into the hopper 38, completely filling the forms. Then the forms are leveled off by means of the scraper plate 42. Following this, the scraper plate 42 is moved out of the way, and the bottom plate 39 is removed from the bottom. The forms containing the mud are moved down against the ground or platform beneath the frame of the vehicle by turning the handwheel 22, following which the bricks are removed from the forms. This is done by turning on the vibrator and lifting the forms by the handwheel while the plates 31 and 32 are held down on the bricks. This will leave the bricks 59 on the ground or platform in the position shown in Fig. 5, which is the position in which the brick is resting on its 4" x 18" surface (in the case of a standard size brick).

Figure 6:
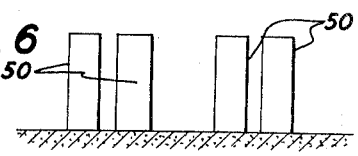
Fig. 6 shows a row of bricks deposited by the machine.

Following the depositing of these two bricks, the machine is then moved away from the location by rolling it and the hopper is again filled with mud as before, and then the machine may be rolled to a position adjacent the first two bricks to deposit the next set of two bricks nearby. In this way a large number of bricks may be deposited in a row in the manner indicated by Fig. 6.

The bricks should be left undisturbed in this position for some time to allow them to set, for example about a day, more or less, depending on weather conditions. Thereafter they will be set sufficiently to allow them to be moved and piled elsewhere for aging for about ten to eighteen days, more of less, depending on atmospheric conditions.

In making bricks of the standard sizes indicated, that is 4" x 12" x 18", I find that with ordinary clay, I should use about a half gallon of water per brick. This makes a much dryer mud than is required when bricks are cast with the large twelve by eighteen surface downward, because in order to fill the mold under the latter condition, it has been the experience that about a gallon and one-half of water is required per brick in order to get the mud to flow to all parts of the mold. Because of the fact that the narrower dimension is at the top and bottom when I mold my bricks, less water is required for causing the mud properly to fill the mold. This difference of about a gallon of water between my brick and prior known bricks is the difference between two weeks or more in aging, because since my bricks start with much less water, they will dry much sooner. Moreover, I find that I do not need to use material such as straw or sand in my bricks because the smaller amount of water evaporated from my bricks does not have to be compensated. Waterproofing material such as asphalt emulsion may, if desired, be used in my bricks, as in the case of any other adobe bricks.

It will be recognized that variations may be made within the scope of my invention. For example, the invention is not dependent on the use of the particular machine disclosed, which is described and disclosed merely for illustrative purposes. Furthermore, more or less than two bricks at a time may, of course, be made as desired. Furthermore, the dimensions of the bricks need not be exactly the same as those disclosed.

Another permissible variation is that the bricks may be rested on their shorter edge instead of their longer edge, that is, on their 4" x 12" edge, instead of on the 4" x 18" edge.

Other modifications and variations may suggest themselves under particular circumstances, and the invention is not to be limited except in accordance with the scope of the appended claims.

I claim:

1. The method of making solid adobe bricks which comprises casting fluid brick material in the form of rectangular prisms, said material containing little enough water so that the brick, upon casting, is immediately self-supporting on one of the edges of smaller area than the largest face, and depositing the brick while in the wet and self-supporting condition on one of the edges of smaller area than the largest face on a platform or base, and allowing it to dry, whereby less water may be used in the brick material than if deposited on its largest face, and the time of drying is accordingly reduced.

2. The method of making an adobe brick which comprises casting mud while in the wet condition in a mold in the shape of a rectangular prism having a pair of opposite faces constituting the sides of largest area, and two other pair of opposite sides which are of smaller area than the area of the first mentioned pair of sides, said mud containing little enough water so that the brick, upon casting, is immediately self-supporting on one of said other pair of sides, removing the wet cast brick from the mold and resting the wet brick on one of said other sides and allowing the brick to dry and set in this position, whereby less water may be used in the mud than if the wet form were rested on its largest face, and the time of drying is accordingly reduced.

3. The method of making an adobe brick in the shape of a rectangular prism having six faces, one pair of opposite faces being of larger area than the other faces, which comprises forming the brick of wet clay in a mold, removing the wet brick from the mold in an immediately self-supporting condition when rested on one of its faces of smaller area than the face of larger area and resting the wet brick to dry on one of its faces which is of smaller area than said faces of larger area, whereby less water may be used in the wet clay than if the wet brick were rested on its largest face, and the time of drying is accordingly reduced.

4. The method of making an adobe brick with dimensions in the proportion of substantially 4" x 12" x 18", which comprises pouring mud in a mold of the dimension of the brick and thus forming a brick which is immediately self-supporting on one of its smaller edges, and removing the mold from the wet brick while vibrating the mold with the brick resting on one of its smaller edges and then allowing it to dry in this position, whereby less water may be used in the mud than if rested on its 12" x 18" surface, and the time of drying is accordingly reduced.

5. The method of making adobe bricks with dimensions in the proportion of substantially 4" x 12" x 18", which comprises pouring mud in a form to shape the bricks, the mud containing little enough water so that the bricks are immediately self-supporting on one of their 4" x 12" surfaces upon pouring the mud in the form, and immediately resting the wet bricks outside the form on one of their 4" x 12" surfaces to dry, whereby less water may be used in the mud than if the bricks are rested on their 12" x 18" surfaces and the time of drying is accordingly reduced.

6. The method of making adobe bricks which comprises making a mud by mixing clay with an amount of water which is in about the proportion of one-half gallon of water for a cubical dimension of 4" x 12" x 18", casting the mud in a mold to form an immediately self-supporting brick and allowing the wet molded brick to dry while resting outside the mold on one of its edges.

7. The method of making adobe bricks which comprises pouring mud in a form in the shape of a rectangular prism having a removable top and bottom, the top and bottom forming one of the smaller edges of the prism, and thereby forming a brick which is immediately self-supporting on one of its edges, removing the bottom and extruding the brick from the form so that the self-supporting brick rests on one of its edges, whereby less water may be used in the mud than if the brick is rested on its largest surface, and the time of drying is accordingly reduced.

8. The method of making an adobe brick with dimensions in the proportion of approximately 4" x 12" x 18" which comprises filling a mold having vertical walls including the 12" x 18" dimension, with a clay mixed with only enough water to cause the clay to fill the mold in this position, and thus form a brick which is immediately self-supporting on one of its edges, and then immediately resting the self-supporting wet brick outside the mold on one of its edges to dry.

9. The method of making an adobe brick in the shape of a rectangular prism having a pair of opposite faces of larger area than the other faces of the brick which comprises pouring into a mold having vertical walls, two of which are opposite walls of the dimensions of said larger faces, a mud made of clay mixed with only enough water to cause the mud to flow and fill the mold and thus forming a brick which is immediately self-supporting on one edge and then placing the bottom of the self-supporting brick on a support and lifting the mold from the brick while vibrating it to prevent the brick from rising so that the wet brick after removal of the mold is resting intact on one of its edges.

EMORY V. HICKEY.

REFERENCES CITED

The following references are of record in the file of this patent:

UNITED STATES PATENTS

| Number | Name | Date |
| --- | --- | --- |
| 568,266 | McCarel | Sept. 22, 1896 |
| 800,242 | Pixley | Sept. 26, 1905 |
| 2,050,225 | Kohler | Aug. 4, 1936 |
| 2,103,649 | Sullivan | Dec. 28, 1937 |